US008620036B2

(12) United States Patent
Irmatov et al.

(10) Patent No.: US 8,620,036 B2
(45) Date of Patent: Dec. 31, 2013

(54) SYSTEM AND METHOD FOR CONTROLLING IMAGE QUALITY (75) Inventors: Anwar A. Irmatov, Moscow (RU);
Dmitry Y. Buryak, Moscow (RU);
Victor D. Kuznetsov, Moscow (RU);
Wang-Jin Mun, Seoul (KR);
Hae-Kwang Yang, Gyeonggi-do (KR);
Yong-Jin Lee, Seoul (KR)

(73) Assignee: S1 Corporation (KR)

( * ) Notice: Subject to any disclaimer, the term of this patent is extended or adjusted under 35 U.S.C. 154(b) by 1291 days.

(21) Appl. No.: 12/123,123

(22) Filed: May 19, 2008

(65) Prior Publication Data
US 2008/0298644 A1 Dec. 4, 2008

(30) Foreign Application Priority Data

May 29, 2007 (RU) ................................ 2007119908

(51) Int. Cl.
*G06K 9/00* (2006.01)
(52) U.S. Cl.
USPC ............ 382/118; 382/190; 382/206; 382/224

(58) Field of Classification Search
USPC .................................. 382/118, 190, 206, 224
See application file for complete search history.

(56) References Cited

U.S. PATENT DOCUMENTS

| 6,826,300 | B2 | 11/2004 | Liu et al. |
| 7,031,499 | B2 | 4/2006 | Viola et al. |
| 7,142,697 | B2 | 11/2006 | Huang et al. |
| 7,203,346 | B2 | 4/2007 | Kim |

*Primary Examiner* — Ruiping Li
(74) *Attorney, Agent, or Firm* — Schwegman, Lundberg & Woessner, P.A.

(57) ABSTRACT

An image quality control system and method is disclosed. At least one infrared camera takes a screen image of a room. When there are a plurality of cameras, images of the cameras are synchronized with respect to time, and a specific object of the image is tracked to estimate image quality of the object. When there are a plurality of cameras, a 3D screen model is reconfigured, and positions of the cameras and the infrared lighting tools are controlled. Infrared lighting and the cameras are controlled, and particularly, optical axis direction, optical magnification, exposure time, and the iris of the camera can be amended. Next, a high-quality object image list can be generated so as to process the images.

12 Claims, 5 Drawing Sheets

SYSTEM AND METHOD FOR CONTROLLING IMAGE QUALITY

RELATED APPLICATION

This application claims priority under 35 U.S.C. 119 to Russian Patent Application No. 2007119908, filed May 29, 2007, which application is incorporated herein by reference and made a part hereof.

BACKGROUND OF THE INVENTION (a) Field of the Invention

The present invention relates to a biometric figure identification system using a figure's face image.

The present invention further relates to a technique for adaptively recognizing a figure by considering a face attribute of a watch list in a condition in which lighting is non-uniform and a face rotation angle range of the image is wide.

(b) Description of the Related Art

Techniques for recognizing a figure according to a face image have been a matter of concern and interest for several decades. A human face image identification system is based on a method of comparing a similar model that is acquired according to an input analysis image and a known face model (or image) of a specific person. Most of the above-noted systems are required to compare a frontal face image that has been acquired under a condition of controlled lighting and an image only some years ago. The requirement condition has restricted the fields to which the actual recognition system is applied.

U.S. Pat. No. 7,142,697[1] of "Face Recognition System and Process Invariable by Pose" proposes a face recognition method based on a method for manufacturing a classifier according to camera angles to a face. Identification results are output by combining results of the classifiers. A face image to be recognized is coded by using the PCA scheme. A neural network is used as a basic classifier, its input includes PCA vectors, and its output includes measured approximate values that are coded with registered classes. The neural network is used again so as to output results, an input unit of the neural network receives similarity measurement values from first-stage classifiers, and an output unit thereof proposes a shape displayed on the figure picture and checks the recognized class. Accordingly, the above-noted invention can recognize a face when the face rotation angle has a wide range. However, it is difficult to use the neural network cascade in real-time because it uses a large amount of computation.

U.S. Pat. No. 7,203,346[2] of "Method and Device for Recognizing a Face by using a Component Based Face Describer" proposes a face recognition algorithm for measuring similarity according to individual patches (e.g., eyes, lips, nose, and forehead) of a face image, and comparing two face images. Calculated weights are added to the calculated measurement values, and the similarity of the two images is finally measured. Further, temporary calculation estimation on the figure appearance is performed by the LDA method, and acquired information is used to compare the two faces. An image coding process on the face parts is performed by the LDA method. The above-noted method is efficient for a case in which lighting conditions are not complex and the face view is not the front of the face. However, the algorithm does not consider relative type and image characteristics of the registered user's face.

U.S. Pat. No. 7,031,499[3] of "Target Recognition System" recognizes the face based on a filter set and a simple classifier amplification method, generates a classifier cascade, and in this instance, adaptively sets values of the cascade elements. The filter is directly selected by specific registered users.

U.S. Pat. No. 6,826,300[4] of "Classification Based on Features" proposes a method for measuring image similarity using a template. In this instance, the invention uses the augmented Gabor feature vector of the face image based on the Gabor wavelet basis. The invention uses a method for selecting an important effective shape of the face image based on the PCA and LDA methods, and measures the similarity according to one of the Mahalanobis measurement method and the cosine measurement method. However, the similarity measurement and calculation method do not consider data characteristics and are not adaptive to the image of a specific watch list.

The basic drawbacks of the existing intelligent video monitoring system and the biometric system are: low precision; low operational stability in non-uniform lighting conditions; and impossibility of control on a human operation capture device.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to improve recognition efficiency under poor conditions by adaptively controlling a recognition method according to characteristics of a watch list.

In order to achieve the technical object, it is desirable to develop a method and system for automating a biometric figure identification process on a face image. The method and system can be used for determining a matching state between registered face data of a wanted criminal database and an acquired face image particularly by using and searching a watch list. The first part of the task has been solved by developing a method that is developed for recognizing a face on an image, and includes subsequent processes:

registering a set of images including checked recognition objects;

applying an image classification algorithm for measuring similarity between two images and determining identification, that is, estimating similarity between the image to be tested and the registered image by using the algorithm and then determining the class of the image to be tested;

generating a binary classifier for identifying an object of the designated class from other classes so as to classify input images; and recognizing an input image appropriate for classification according to a plurality of registered images by using the method of applying the binary classifier, and combining classification results.

The characteristics of the present invention include, as described above:

automatically applying a face image characteristic of a specific registered user;

high recognition performance on the figure's face under the conditions of noise, shade, and extraneous factors (e.g., glasses); and identifying the figure according to a watch list (blacklist).

The present invention applies new skills for solving the object, as follows:

automatically identifying a face that is difficult to recognize by the algorithm from a user registration list;

proposing classification types for considering characteristics of the recognition algorithm function on specific registered users; and improving the identification algorithm by applying a high-precision face checking method to the general recognition process cascade.

The method is realized by using a device for recognizing a face on the image, and the device includes:

a registered image database in which respective images include information on the object to be recognized;

a basic image classifier for measuring similarity between two images, determining a matching state thereof, and applying the determination to similarity estimation of the test image and the registered image and determination of test image classes;

a learning means for generating a binary classifier for classifying the object of the class designated by other objects, and being applicable to input image classification; and a recognition means for classifying input images according to a plurality of registered images by using a binary classifier and combining classification results.

DETAILED DESCRIPTION OF THE EMBODIMENTS

In the following detailed description, only certain exemplary embodiments of the present invention have been shown and described, simply by way of illustration. However, the present invention can be realized in various manners, and is not restricted to the exemplary embodiment to be described. For clarification of drawings in the present invention, parts that are not related to the description will be omitted, and the same parts will have the same reference numeral throughout the specification.

Throughout this specification and the claims that follow, unless explicitly described to the contrary, the word "comprising" and variations such as "comprises" will be understood to imply the inclusion of stated elements but not the exclusion of any other elements.

Exemplary embodiments of the present invention will now be described in detail with reference to the accompanying drawings.

Figure 1:
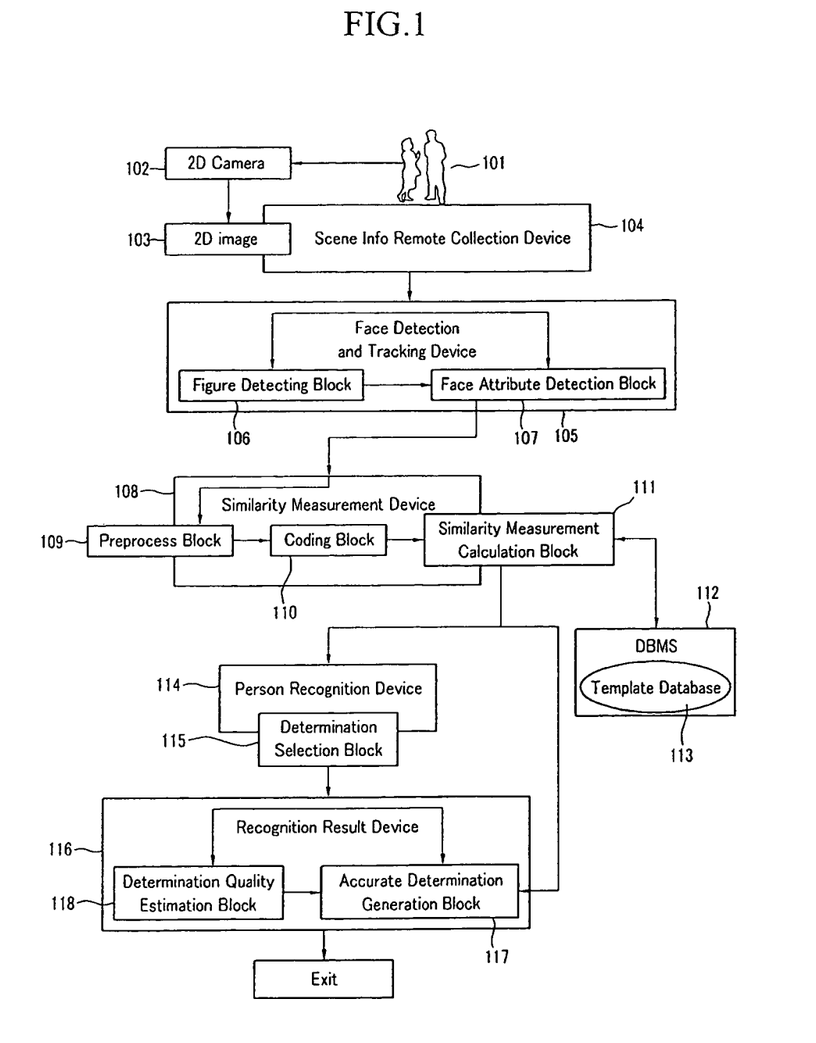
FIG. 1 is a schematic diagram for a face recognition device according to an exemplary embodiment of the present invention.

FIG. 1 shows a face detection and recognition system according to an exemplary embodiment of the present invention.

Figure 2:
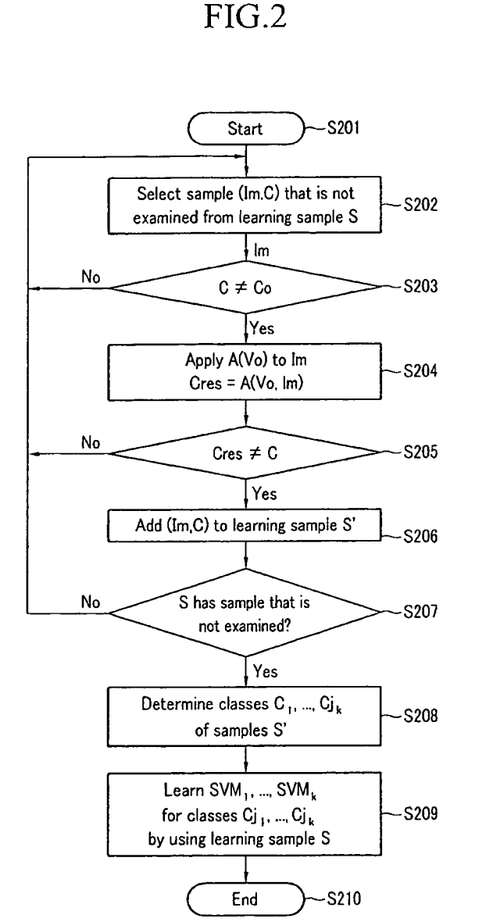
FIG. 2 is a flowchart of a binary classifier learning algorithm for checking recognition results according to an exemplary embodiment of the present invention.

FIG. 2 is a flowchart of a binary classifier learning algorithm for checking recognition results.

Figure 3:
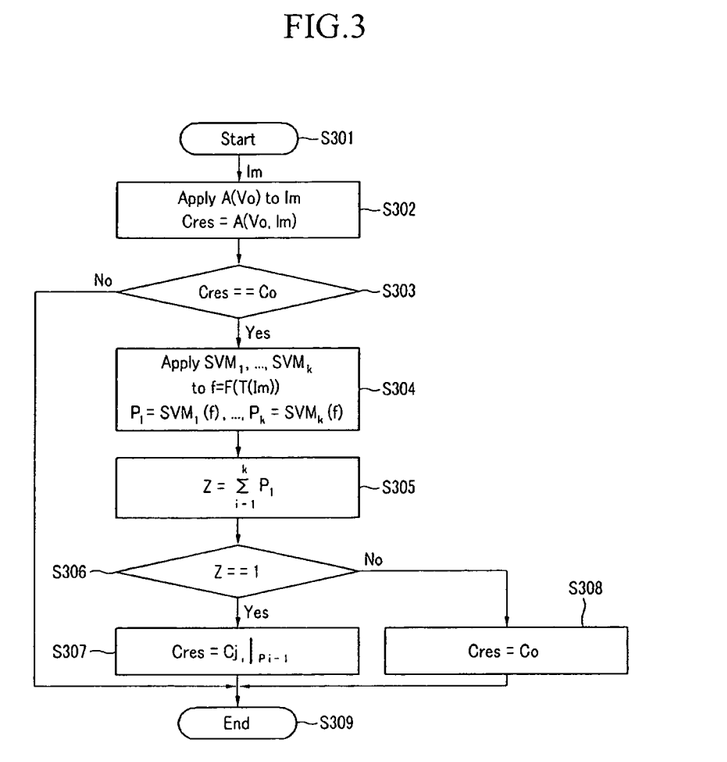
FIG. 3 is a flowchart of a recognition result checking algorithm according to an exemplary embodiment of the present invention.

FIG. 3 is a flowchart of a recognition result checking algorithm.

Figure 4:
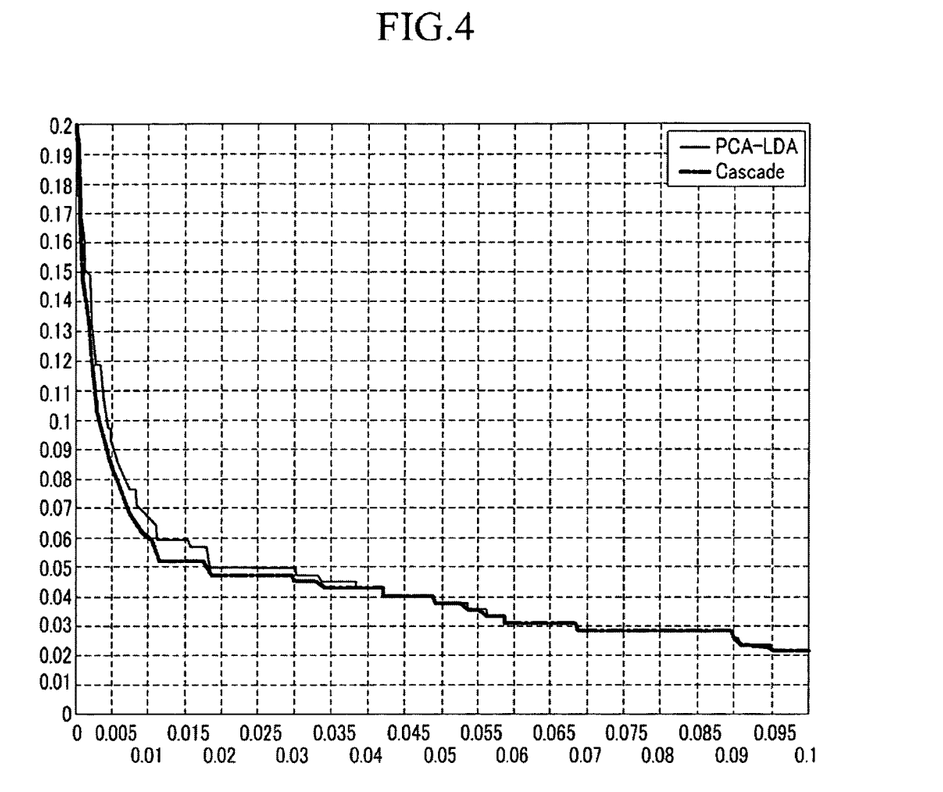
FIG. 4 is a comparison result on one of tests from among the realization method of the present invention.

FIG. 4 is a comparison result on one of tests from among the realization method of the present invention. A FAR-FRR a curve for the basic algorithm A (PCA-LDA) and a curve that is acquired after the recognition result checking method (cascade) generated from checking of a task are shown.

Figure 5:
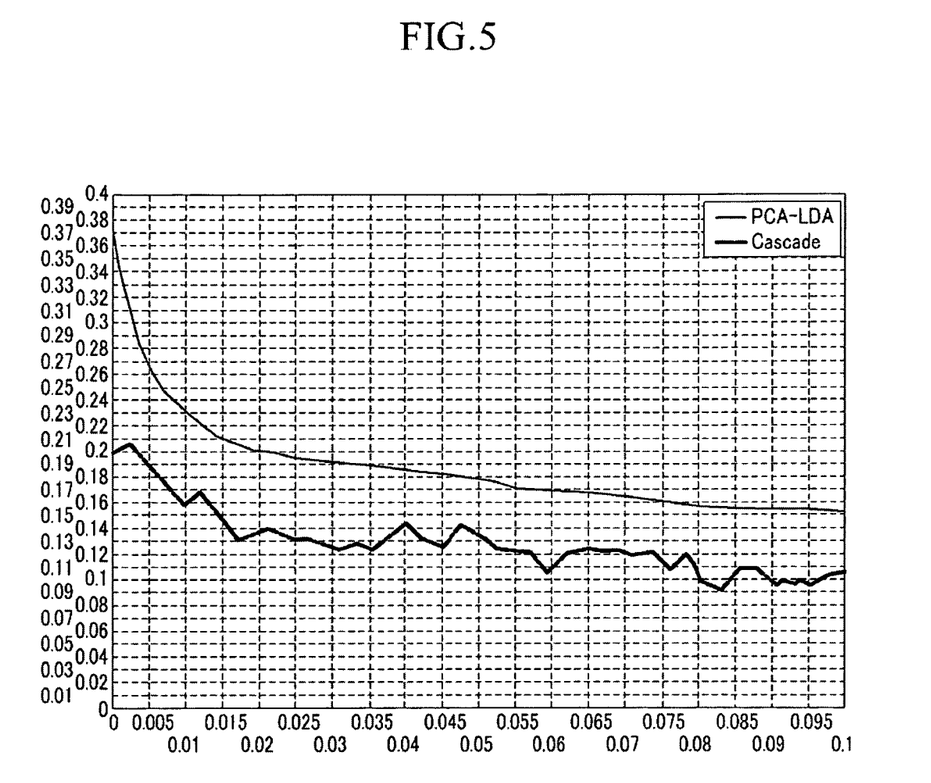
FIG. 5 is a comparison result tested in the watch list from among the realization method of the present invention.

FIG. 5 is a comparison result on one of tests from among the realization method of the present invention. A FAR-FRR a curve for the basic algorithm A (PCA-LDA) and a curve that is acquired after the recognition result checking method (cascade) generated from checking of a task by using a list of 100 persons are shown.

As shown in FIG. 1, a scene 101 captured by using a 2D camera 102 is converted into a 2D image by a scene information remote collection device 104, and the 2D image is transmitted to a human face detection and tracking device 105. A figure detection block 106 and a face attribute detection block 107 function as a detection mode or a tracking mode depending on the device's present condition.

A detection method based on the 2-stage cascade is applicable to the basics of the algorithm of the figure detection block 106. In the 1-stage cascade, a Gabor filtering process and the manufactured face model and the acquired figure map are compared so as to determine a patch available for finding a face. In the 2-stage cascade, the SNoW-based neural network is used to acquire an accurate position and size of a rectangle in which the face is provided from the input image.

Parameters of the found rectangular patch are transmitted to the face attribute detection block 107 where the face attributes includes eyes, lips, nose, and eyebrows. The algorithms are performed based on a method for analyzing color information, brightness information, and gradient information on a human face.

The data on the face attribute are transmitted to a similarity measurement device 108 that performs the detected face's recognition algorithm together with a person recognition device 114. Many algorithms that can be applied thereto have been developed according to the subsequent processes:

preprocessing an image and identifying features, i.e., manufacturing a figure map;

reducing the feature of the acquired image, i.e., reducing the dimension of a feature vector;

computing similarity attributes with template vectors stored in the database; and classify the acquired vector (determined rule).

There are a plurality of methods for realizing the described stages, and one of the methods will now be described.

Gabor wavelet comb filters are used to pre-process and extract a figure having image information on the face and eyes (in a preprocessing block 109). The Gabor wavelet comb filters form basic filters for a directional band and a directional curve so as to identify features of images having stable information according to the image figure, frequency of features, direction, and curvature. Different periods, direction, and numbers of curvatures are selected to greatly express the face appearance features.

The acquired preprocessed image is coded by applying the PCA method and the LDA method. The analysis allows inter-class variables to be minimized when the inter-class variables are maximized. In this case, one class represents all various face images of the same person that are acquired in various conditions and times.

The distance (measurement) between the classified image and the template image is used so as to classify an acquired dimension-reduced feature image. The Mahalanobis distance can be used as a similar measurement.

It is preferable to use at least one dimension-reduced feature image so as to classify the images. In this case, the complete dimension-reduced image includes a plurality of individual dimension-reduced feature images. The individual dimension-reduced feature images can be totally or partially different according to the preprocessing method, dimension-reduced patch, and measurement for classification. The final measurement for the similarity of two faces is calculated according to the similarity values of the dimension-reduced feature image. The values are combined by applying the Adaboost method.

The measured similarity values for the respective registered classes reflected to the database are transmitted to the person recognition device 114. The class of the object that is expressed as an image is determined by using a predetermined method such as a limit rule (in a determination selection block 115).

A recognition result checking device 116 processes the subsequent determination, which will be described. In the first stage, the reliability of the selected determination is estimated by using a determination quality estimation block 118. Detailed execution thereof becomes substantially different depending on the types and control states of the similarity measurement device 108 and the person recognition device 114. An exemplary method will be described. When a face that is proposed based on the selected determination is moved to one of the registered classes, the determination is selected, and additional checking is performed by using an accurate determination generation block 117 in another case. The determination is performed based on application to the input vector by binary classifiers, and the binary classifiers are respectively set to identify classes of the samples that have been incorrectly identified in the learning stage by the person recognition device. The SVM is generally used for the classifiers.

The outputs of the recognition result checking device 116 are final results that are finally provided by the system. Algorithm constituent elements of the recognition result checking device 116 will now be described.

Assuming that N registered users forming the class gallery C1, C2, . . . CN are given, the face image recognition algorithm realized with the similarity measurement device and person recognition device will be set to be A(v).

$$I \to (C_0, C_1, C_2, \ldots C_N)$$

It includes the subsequent constituent elements:
an input image coding rule that is T: I→X where I is a face image space and X is an image expression space (e.g., the method of principal components can be used for T);
a formula for calculating the distance from the face's input image to the respective classes of the gallery that's is F: X→$R^N$;
a rule for determining whether to include an input image to the registered class, which is:

$$D(v):R^N \to (C_0, C_1, C_2, \ldots, C_N)$$

classes $C_1, C_2, \ldots, C_N$ of the gallery, and a fictitious class $C_0$, where the samples that belong to the fictitious class of D are samples that are not included in the gallery; and
a vector configuration parameter v influencing the class selection (the rule is to use the nearest neighboring value as D when v is the peak value in the simplest case).

S is set to be a learning sample, and the algorithm A is applied to all the samples belonging to S in the case of a specific set having various parameters v. The respective values v correspond to the first and second recognition error levels (FAR and FRR).

FIG. 2 shows a learning algorithm flowchart of a classifier for checking the recognition result in the recognition result checking device when the value $V_0$ of the parameter V is recorded. The sample (Im, C) (C≠$C_0$) belonging to the figure gallery is selected from the learning sample S (S202). The algorithm A having a parameter is applied to the acquired sample (S204), and the algorithm selects the samples having generated an FRR error and adds the same to the learning sample S (S206). When it is assumed that the sample belongs to the class $C_{j1}, C_{j2}, \ldots, C_{jk}$, a learning process for k binary $SVM_1, SVM_2, \ldots, SVM_K$ is performed for the samples acquired from S (S207, S208, and S209). The binary $SVM_1, SVM_2, \ldots, SVM_K$ respectively correspond to one of the identified classes, and designate a hypersurface for dividing the object of the designated class from all other classes.

The established SVM generates an image of $R^N \to \{0,1\}$, and $R^N$ is a vector space being formed by the function F and including values that are near the classes of the gallery. The SVM is adaptively and directly controlled according to the objects of the class that are mistakenly classified by the basic recognition algorithm in the learning process.

The complete recognition algorithm has two cascade stages. In the first stage, the basic algorithm A having the selected parameter v0 is performed. Next, the generated SVM is applied.

Referring to FIG. 3, interaction of the algorithm included in the recognition result checking device will be described when an input image Im is identified.

In the first stage, the initial image is processed by the algorithm A having the parameter v0 (S302). Performance of the algorithm A is finished (S303 and S309) when the algorithm A classifies the proposed face as one of the registered classes. The second cascade is performed in another case (S304-S307 or S308). The respective generated SVM's process the similarity measurement vector on the gallery class, and the vector is acquired after the distance is calculated through the function F. The final recognition determination is formed by the subsequent rule. When one SVM identifies the input vector, the face in the input image Im is moved to the corresponding SVM class, and it is determined in another case that the face does not belong to any of the registered classes.

This description corresponds to the task for identifying the watch list. The present invention can be used as described above, and can also be used for the verification task. In this case, the SVM learning is performed in the control stage for the respective known classes. The object function of the SVM identifies the same of the designated class and all other objects from the learning sample.

In the function mode, the basic algorithm is applied to the SVM that corresponds to the class to be checked when it is required to check the input target.

The main realization scheme of the present device is to use the device for the purpose of increasing the efficiency of the existing video monitoring system and manufacturing the new class intelligent system. The intelligent system is suitable for intelligent video monitoring of the user, and the biometric identification of the person according to a watch list. The device is realized as a board and has at least one signal processor.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, the respective devices configuring the image quality control system according to the exemplary embodiment of the present invention and the elements configuring the respective devices can be additionally added or combined depending on the functions. Further, the image quality control method according to the exemplary embodiment of the present invention can be configured with their orders changed. The scope of the present invention will include the subsequent claim description and equivalent technical elements.

What is claimed is:

1. A method for recognizing a face within an image, comprising:
  performing facial recognition of an input image using a person recognition device, with operations including:
    classifying a plurality of sample images into classes, images of the plurality of sample images respectively having information on a face of a target to be recognized according to classifications;
    recording classifications of the plurality of sample images in a database;
    estimating similarity between the input image and the sample images in the database based on an image classification algorithm for measuring similarity of two images and determining identification thereof;
    determining a first class of the input image based on a result of the estimated similarity between the input image and the sample image;
  performing verification for the facial recognition of the input image using a recognition result checking device, with operations including:
    generating, for each particular class of the database, a binary classifier for identifying a face of a target of the particular class of the database, wherein the binary classifier includes a multiple vector having a similarity measurement value between the input image and a corresponding sample image in the particular class of the database, and wherein the binary classifier is used to identify classes of sample images in the database that are incorrectly identified by the person recognition device;
    attempting to apply the binary classifier generated for each particular class of the database to the input image;
    determining a second class of the input image based on a result of successfully applying a particular binary classifier; and
    combining the first and the second classes determined for the input image; and
    confirming the facial recognition of the input image based on a result of the combining the first and the second classes.

2. The method of claim 1, wherein generating a binary classifier includes generating the binary classifier for suspect classifications recorded in the database, by:
  generating image learning samples corresponding to face images of other persons which are different from face image samples classified in the database;
  selecting a face image sample of the database based on the image learning samples;
  applying a basic classification algorithm to the selected face image sample and selecting an inaccurately classified sample of the image learning samples; and
  generating the binary classifier for each particular class corresponding to the inaccurately classified sample.

3. The method of claim 1, wherein the similarity measurement value between the input image and an image of the class of the input image is calculated according to a minimum distance between the input image and all the images of the class of the input image.

4. The method of claim 1, wherein attempting to apply the binary classifier generated for each particular class includes:
  generating, for all the classes in the database, a distance vector between the input image and each image of a class;
  applying a binary classifier of a corresponding class to the distance vector by classes; and
  when one of the binary classifiers identifies the distance vector, determining that the input image belongs to a class corresponding to the binary classifier.

5. A device for recognizing a face in an image, comprising:
  an image database storing a plurality of sample images having information on a face of a target to be recognized when each of the plurality of sample images are organized by class;
  a similarity measurement device configured to measure similarity of an input image and the sample images of the image database based on an image classification algorithm measuring similarity of two images and determine identification thereof;
  a person recognition device configured to determine a first class of the input image based on a result of measuring similarity, the person recognition device configured to perform operations that:
    classify the plurality of sample images into classes, images of the plurality of sample images respectively having information on a face of a target to be recognized according to classifications;
    record classifications of the plurality of sample images in the image database;
    determine a first class of the input image based on a result of the estimated similarity between the input image and the sample image, using the similarity measurement device; and
  a recognition result checking device configured to attempt to apply a binary classifier for each class of the image database to identify a face of a target of a class and verify the first class of the input image, with operations that:
    generate, for each particular class of the image database, the binary classifier,
      wherein the binary classifier includes a multiple vector having a similarity measurement value between the input image and a corresponding sample image in the particular class of the database,
    attempt to apply each binary classifier to the input image;
    determine a second class of the input image based on a result of successfully applying a particular binary classifier;
    combine the first and the second classes of the determined for the input image; and
    finally determine which class corresponds to the input image based on a result of combining;
  wherein at least one of the above devices are implemented by at least one processor.

6. The device of claim 5, wherein the recognition result checking device is configured to generate the binary classifier for suspect classifications recorded in the database, with use of:
  a displayed image learning sample designer configured to generate an image learning sample corresponding to face images of persons which are different from face image samples classified in the image database;
  a device configured to select a face image sample of the classes based on the image learning sample;
  a device configured to apply a basic classification algorithm to the selected face image sample and selecting an inaccurately classified sample of the image learning samples; and a binary classifier manufacturing component configured to generate the binary classifier for each particular class corresponding the inaccurately classified sample.

7. The device of claim 5, wherein the recognition result checking device:
   generates, for all the classes in the image database, a distance vector between the input image and each image of a class;
   applies a binary classifier of a corresponding class to the distance vector by classes; and
   when one of the binary classifiers recognizes the distance vector, determines that the input image belongs to a class corresponding to the binary classifier.

8. The method of claim 1, wherein applying each binary classifier applies a binary classifier to an input image whose class is not determined.

9. The method of claim 1, wherein finally determining the class of the input image includes finally determining the class of the input image to correspond to the class determined based on a result of the estimating when the class of the input image is successfully or unsuccessfully determined during the estimating.

10. The method of claim 4, wherein applying each binary classifier further includes:
   when any one of the binary classifiers does not identify the distance vector, determining that the input image does not belong to any class.

11. The device of claim 5, wherein the recognition result checking device applies a binary classifier to an input image whose class is not determined by the person recognition device.

12. The device of claim 7, wherein the recognition result checking device determines the class of the input image as a class determined by the person recognition device when the class of the input image is determined by the person recognition device, and determines the class of the input image as a class determined based on the result of applying each binary classifier when the class of the input image is not determined by the person recognition device.

* * * * *